(12) United States Patent
Smythe

(10) Patent No.: US 7,766,309 B1
(45) Date of Patent: Aug. 3, 2010

(54) CARBON DIOXIDE MANIFOLD

(76) Inventor: John R. Smythe, 2901 E. Voorhees St., Danville, IL (US) 61834

( * ) Notice: Subject to any disclaimer, the term of this patent is extended or adjusted under 35 U.S.C. 154(b) by 888 days.

(21) Appl. No.: 11/646,113

(22) Filed: Dec. 27, 2006

Related U.S. Application Data

(60) Provisional application No. 60/754,988, filed on Dec. 29, 2005.

(51) Int. Cl.
*B01F 3/04* (2006.01)
(52) U.S. Cl. .............................. 261/62; 261/63; 261/66
(58) Field of Classification Search .................. 261/62, 261/63, 65, 66, 69.1, DIG. 7
See application file for complete search history.

(56) References Cited

U.S. PATENT DOCUMENTS

| | | | | |
|---|---|---|---|---|
| 3,109,873 A | * | 11/1963 | Hotchkiss | ..................... 261/35 |
| 3,747,475 A | * | 7/1973 | Runkle | ......................... 91/445 |
| 3,770,007 A | * | 11/1973 | Orth et al. | .................... 137/501 |
| 5,113,905 A | * | 5/1992 | Pruitt et al. | .................. 137/571 |
| 6,810,664 B1 | * | 11/2004 | Lorenc | ......................... 60/468 |
| 6,817,385 B1 | | 11/2004 | Sloan et al. | .................... 141/3 |

* cited by examiner

*Primary Examiner*—Scott Bushey
(74) *Attorney, Agent, or Firm*—Philip L. Bateman

(57) ABSTRACT

A carbon dioxide manifold contains an internal passage providing communication between a pump supply, a liquid container, a gas container, and a beverage dispenser. A valve is located inside the internal passage. The valve has an open position in which communication exists between the liquid container, the gas container, and the beverage dispenser, but not with the pump supply. The valve has a closed position in which communication exists between the pump supply and the liquid container, and between the gas container and beverage dispenser, but the only communication between the pump supply/liquid container and the gas container/beverage dispenser is through an orifice that allows a restricted flow of carbon dioxide through the valve.

10 Claims, 4 Drawing Sheets

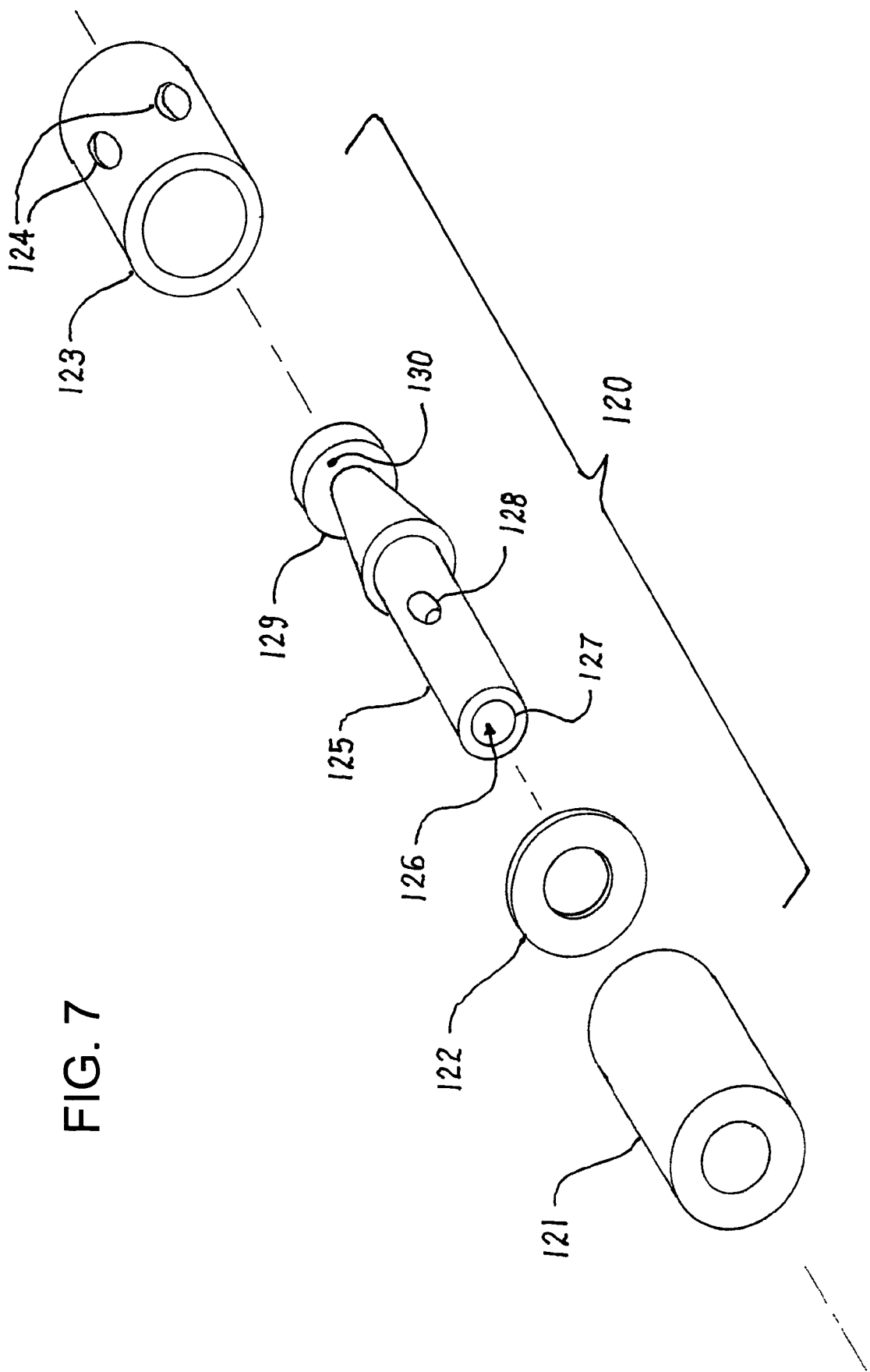

CARBON DIOXIDE MANIFOLD

CROSS-REFERENCE TO RELATED APPLICATION

This application claims the benefit of U.S. Provisional Application Ser. No. 60/754,988, Dec. 29, 2005.

FIELD OF THE INVENTION

This invention relates to the handling of fluid materials. More particularly, this invention relates to the filling and refilling of carbon dioxide tanks.

BACKGROUND OF THE INVENTION

Carbonated beverages such as sodas (also known as soft drinks) contain dissolved carbon dioxide. Carbonated beverages are commonly dispensed in restaurants, cafeterias, and other locations in dispensing machines that mix a concentrated syrup with water and carbon dioxide gas. The carbon dioxide is typically stored in pressurized containers in which it exists as both a liquid and a gas.

The behavior of the carbon dioxide in these pressurized containers follows well known physical laws. In a sealed system containing both a pure liquid and gas, the pressure is determined by the fluid's vapor pressure which, in turn, is a function of the temperature. In other words, the pressure of an isothermal (constant-temperature) sealed system is constant as long as both liquid and gas are present in the system. If so little fluid is present that there is no liquid at equilibrium, the pressure in the system will be less than the vapor pressure. If so much fluid is present that there is no gas at equilibrium, the pressure in the system may greatly exceed the vapor pressure.

Although the vapor pressure remains constant for a constant temperature in a sealed system containing both liquid and gas, the relative amounts of liquid and gas present at equilibrium are a function of the amount of fluid in the sealed system. For example, if the system contains enough fluid to have only a small amount liquid present, almost all the volume of the system will be occupied by gas. Similarly, if the system is nearly filled with liquid, only a small volume of gas will be present.

The vapor pressure of carbon dioxide in pounds force per square inch absolute (psia) is shown in the following table.

TABLE 1

| Vapor Pressure of Carbon Dioxide | | |
| --- | --- | --- |
| Temperature (° C.) | Temperature (° F.) | Pressure (psia) |
| −15 | 5 | 330 |
| −10 | 14 | 380 |
| −5 | 23 | 440 |
| 0 | 32 | 500 |
| 5 | 41 | 580 |
| 10 | 50 | 650 |
| 15 | 59 | 740 |
| 20 | 68 | 830 |
| 25 | 77 | 930 |
| 30 | 86 | 1050 |

The "critical temperature" of carbon dioxide is 31° C. (88° F.) at which point its vapor pressure is about 1070 psia. If the critical temperature is exceeded, liquid and gas no longer exist in equilibrium and the pressure in the system may greatly exceed 1070 psia.

The physical properties of sealed systems of carbon dioxide liquid and gas influence the way in which carbon dioxide gas is provided to beverage dispensers. A conventional carbon dioxide system is disclosed in Sloan et al., U.S. Pat. No. 6,817,385, Nov. 16, 2004, which is incorporated by reference. The refilling of the Sloan et al. system is illustrated in FIG. 1. A supply of refrigerated liquid carbon dioxide is brought to the location in a truck or other pump supply 16. The temperature of the carbon dioxide in the truck is generally near 0° F. and the pressure is about 300 psia. A pump 14 is connected and a vent valve 18 in supply line 12 is positioned to establish communication between the pump supply and a carbon dioxide manifold 10. The carbon dioxide manifold 10 contains an internal valve that is closed during refilling so that the liquid carbon dioxide flows out of the manifold through line 48 and into two liquid containers 50 equipped with valves 52. A line 42 leads to a relief valve 44. Liquid carbon dioxide is added until the liquid containers are full. The vent valve is then opened and the pump supply is removed.

At this point, the internal valve in the carbon dioxide manifold is supposed to open to stop flow from the manifold back through the supply line and to provide communication between the liquid containers and the gas container 70 via line 68 and valve 72. If and when the valve opens, liquid carbon dioxide changes to gas and fills the gas container until the pressure equals the vapor pressure for the temperature of the system. The ratio of two volumes of liquid carbon dioxide to one volume of gaseous carbon dioxide is mandated by governmental regulations and is commonly used. If the ratio is higher, the volume of gaseous carbon dioxide available for immediate use may not be sufficient. If the ratio is lower, the system must be refilled more frequently. The two-to-one ratio also provides a margin of safety to ensure that the system is not completely filled with liquid carbon dioxide. As discussed above, the pressure in the system may greatly exceed the vapor pressure if no gas is present.

The carbon dioxide gas in the gas container is withdrawn through line 76 to carbonate beverages at the beverage dispenser. The system remains at the vapor pressure for the given temperature until all the liquid carbon dioxide has changed to gas. After this point, any subsequent flow of carbon dioxide from the system will decrease the pressure in the system. The decrease in pressure is noted on pressure gauge 64 which is connected to the manifold by line 62 and the system is refilled before the system is empty.

FIGS. 2 and 3 illustrate the manifold in more detail. The manifold contains internal passages that communicate with the pump supply via line 12, with the liquid containers via line 48, with the relief valve via line 42, with the gas container via line 68, with the pressure gauge via line 62, and with the beverage dispenser via line 76. The manifold contains a sliding spool valve 32 that is designed to move between open/operating and closed/refilling positions in response to the relative pressures in the system. The spool valve contains an internal axial passage 78 that provides the communication between line 12 and the rest of the system. When the spool valve is the open/operating position shown in FIG. 2, communication between the liquid and gas containers takes place, and communication through the axial passage is blocked. When the spool valve is in the closed/refilling position shown in FIG. 3, communication between the liquid and gas containers is prevented, and communication through the axial passage is allowed.

As discussed above, the spool valve closes automatically during refilling because of the pressure from the pump supply. The spool valve is supposed to open after refilling. The force to open the spool valve is provided by the residual pressure in the gas container. Most of the time this pressure is greater than the pressure in the liquid containers (which is about 500 psia if the carbon dioxide warms to a temperature of about 32° F. during refilling) and is sufficient to open the valve. However, the residual pressure in the gas container may be less than the pressure in the liquid containers under certain circumstances.

As one example of excessively low pressure in the gas container(s), the pressure in the gas container is at atmospheric pressure (14.7 psia) when the system is first filled. As a second example, the beverage dispensing system may develop a leak and all the carbon dioxide may escape. As a third example, the carbon dioxide may be withdrawn by persons operating the beverage dispensing system until the system is nearly empty. Regardless of how it happens, if the residual pressure in the gas container(s) is less than about 500 psia, the pressure differential is insufficient to open the spool valve. A second embodiment of the Sloan et al. manifold contains a spring to provide an additional opening force. However, even with the additional force of the spring, the spool valve can remain closed after refilling if the residual pressure in the gas container is very low. If the spool valve does not open, carbon dioxide will not flow from the liquid container(s) into the gas container. Instead, it will flow out of the system through supply line 12 and vent valve 18.

Accordingly, there is a demand for a carbon dioxide manifold that reliably opens after refilling even if the residual pressure in the gas container(s) is very low.

SUMMARY OF THE INVENTION

The general object of this invention is to provide an improved carbon dioxide manifold for a carbon dioxide beverage supply system. More particularly, there is a demand for a carbon dioxide manifold that reliably opens after refilling even if the residual pressure in the gas container is very low.

I have invented an improved manifold for a carbon dioxide system comprising a pump supply, a liquid container, a gas container, and a beverage dispenser. The manifold comprises: (a) an internal passage providing communication between the pump supply, the liquid container, the gas container, and the beverage dispenser; and (b) a valve inside the internal passage. The valve has an open/operating position in which communication exists between the liquid container, the gas container, and the beverage dispenser, but not with the pump supply; and has a closed/refilling position in which communication exists between the pump supply and the liquid container, and between the gas container and beverage dispenser, but the only communication between the pump supply/liquid container and the gas container/beverage dispenser is through an orifice that allows a restricted flow of carbon dioxide through the valve.

During refilling, the carbon dioxide manifold of this invention allows a small flow of carbon dioxide from the pump supply/liquid container to the gas container/beverage system. This small flow enables pressure to equalize on both sides of the valve which, in turn, enables the valve to reliably open after refilling.

BRIEF DESCRIPTION OF THE DRAWINGS

FIG. 7 is a perspective view of four components of the valve.

DETAILED DESCRIPTION OF THE INVENTION

This invention is best understood by reference to the drawings. Referring to FIGS. 4 to 7, the carbon dioxide manifold of this invention 100 is similar to the manifold disclosed in Sloan et al., U.S. Pat. No. 6,817,385, Nov. 16, 2004, previously incorporated by reference. As previously discussed, the Sloan et al. manifold contains a pressure-differential-activated sliding spool valve that completely prevents the flow of carbon dioxide between the pump supply/liquid container and the gas container/beverage system during refilling. There is one major difference between the manifold of this invention and the Sloan et al. manifold—the manifold of this invention contains an orifice that allows a restricted flow of carbon dioxide through the valve even when the valve is in the closed/refilling position.

Figure 1:
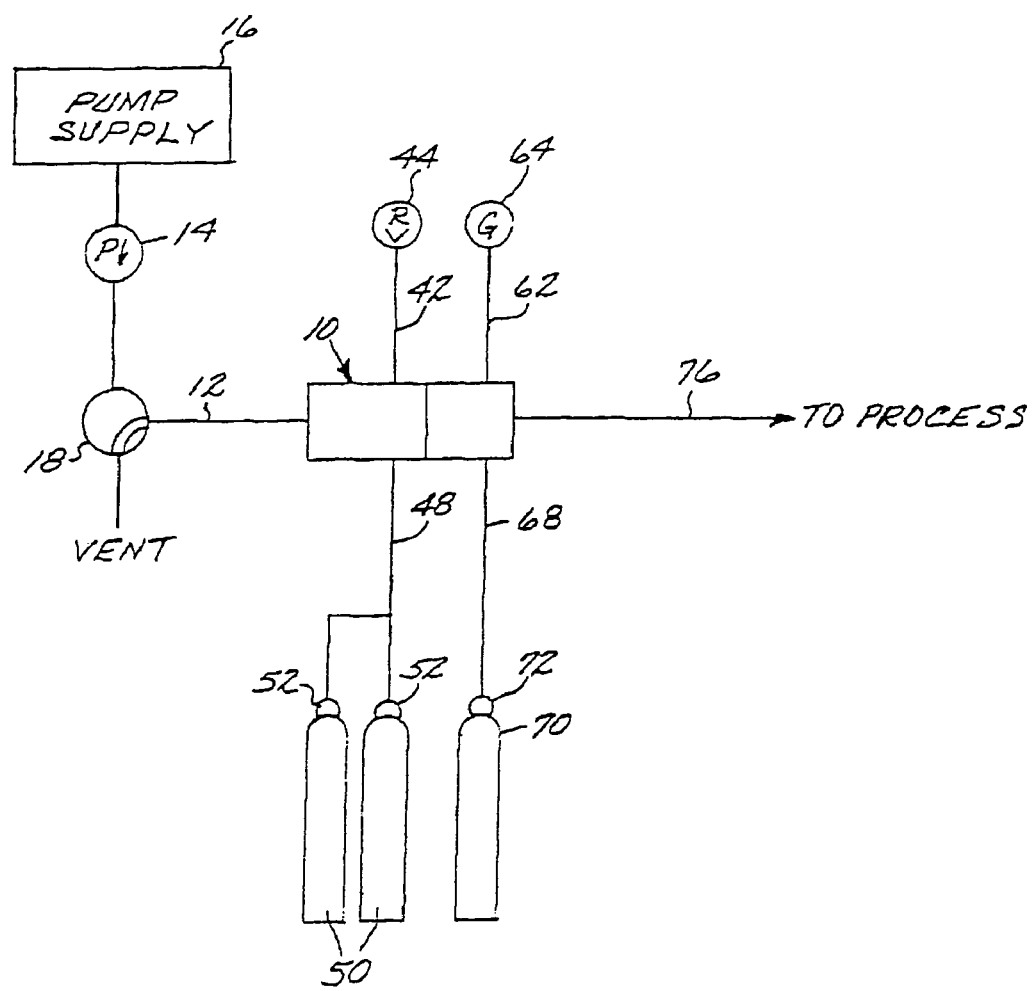
FIG. 1 is a schematic diagram of a prior art carbon dioxide beverage supply system.
Figure 2:
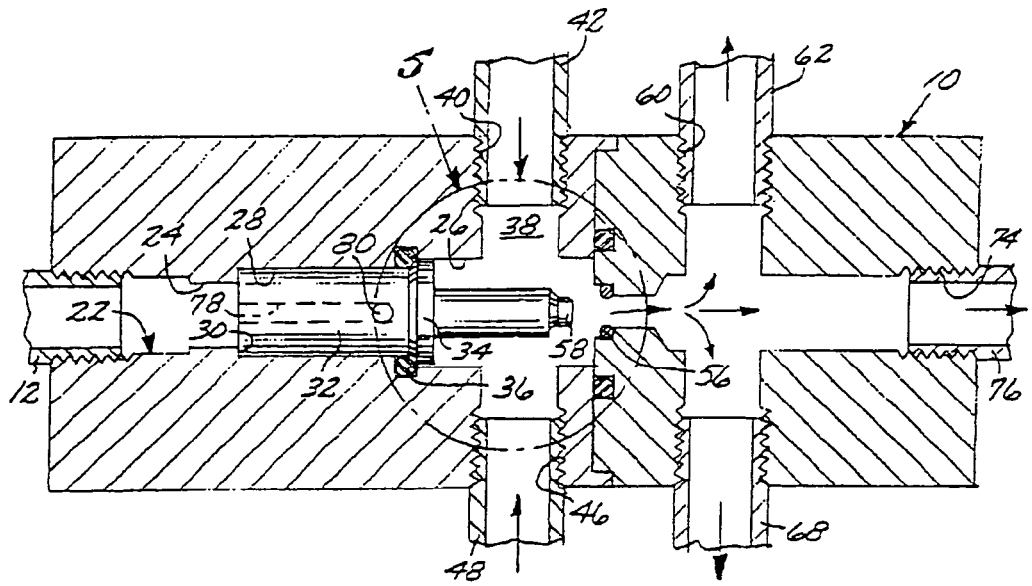
FIG. 2 is a sectional view of a prior art carbon dioxide manifold with its valve in the open/operating position.
Figure 3:
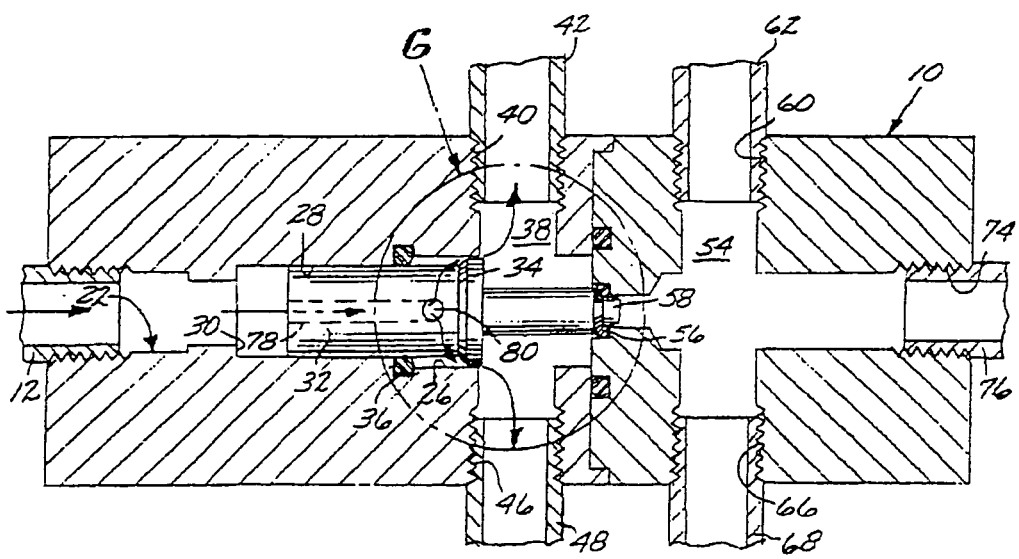
FIG. 3 is a sectional view thereof with the valve in the closed/refilling position.
Figure 4:
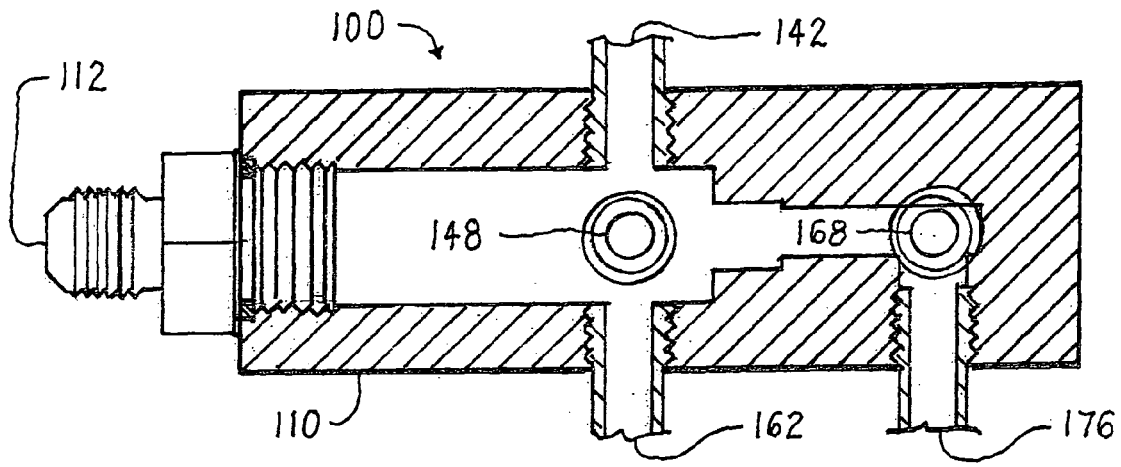
FIG. 4 is a sectional view of the carbon dioxide manifold of this invention with the valve omitted.

Referring now to FIG. 4, the manifold body 110 contains an internal passage with multiple openings, each of which contains a fitting. Opening 112 communicates with a pump supply that supplies refrigerated liquid carbon dioxide at an elevated pressure. Openings 142 and 162 communicate with liquid carbon dioxide containers. Opening 148 communicates with a pressure relief valve typically set to open at about 1500 psia. Opening 168 communicates with a pressure gauge and a beverage dispensing system. Opening 176 communicates with one or more gas carbon dioxide containers. The longitudinal portion of the passageway is of three different sized diameters, which are progressively smaller moving from upstream to downstream. As will become apparent, the varying diameters provide an effective means of positioning the spool valve components in the manifold body.

Figure 5:
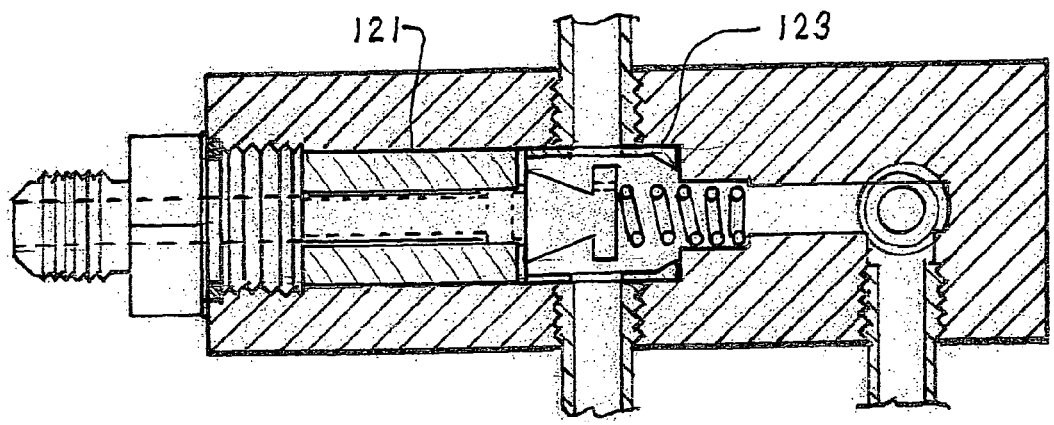
FIG. 5 is a partial sectional view thereof with the valve in the open/operating position.
Figure 6:
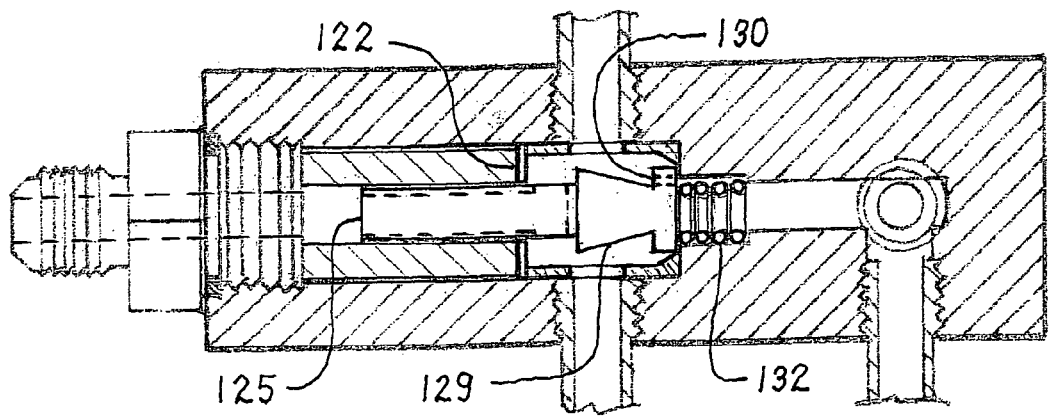
FIG. 6 is a partial sectional view thereof with the valve in the closed/refilling position.

Referring now to FIGS. 5 to 7, a sliding spool valve assembly 120 is located in the longitudinal portion of the passageway. The valve assembly contains a first sleeve (a cylindrical annular member) 121, a washer 122, a second sleeve 123 having four, equally spaced apart openings 124 in its side wall, a piston 125 having an internal chamber 126 with both an inlet 127 and an outlet 128, a head 129 on the downstream end of the piston having a cylindrical orifice 130, and a spring 132 that biases the piston/head into the open/operating position illustrated in FIG. 5. The spring is held in place on the shoulder formed at the intersection of the smallest and middle diameter portions of the longitudinal passageway.

The second sleeve is held in place on the shoulder formed at the intersection of the middle and largest diameter portions of the longitudinal passageway. The function of the second sleeve is simply to hold the first sleeve in place. The holes in its side walls provide communication to the liquid carbon dioxide containers and to the pressure relief valve, regardless of the rotation of the second sleeve within the manifold. The washer is preferably made of an impervious flexible material such as TEFLON fluorocarbon polymer. All the other components are preferably made of stainless steel.

The operation of the carbon dioxide manifold can now be considered. During normal operation of the carbon dioxide beverage system associated with the manifold, the piston/head of the sliding spool valve is pushed by the force of the spring against the washer at the edge of the first sleeve as shown in FIG. 5. This position is considered the open position because carbon dioxide from the liquid containers to free to vaporize and enter the gas container. The outlet of the internal chamber in the piston is blocked by the inner surface of the first sleeve so that no carbon dioxide can escape out the supply line.

When the carbon dioxide beverage system needs to be refilled, liquid carbon dioxide under pressure is pumped into the manifold. The pressure of the liquid forces the piston/head of the sliding spool valve against the spring and the head presses against the shoulder to seal off the passageway as shown in FIG. 6. This position is considered the closed position because the flow of carbon dioxide from the liquid containers to the gas container is substantially restricted. The outlet of the internal chamber in the piston is now exposed and allows liquid carbon dioxide to enter the liquid containers to refill them. Even though the valve is closed, the orifice in the head allows a very small amount of carbon dioxide to flow into the gas container. This flow enables the pressure in the gas container to slowly increase during refilling. When the liquid containers are full, the pump is turned off and the supply line in vented to the atmosphere. The gas pressure in the gas container (which has increased during refilling), combined with the force of the spring, moves the piston/head back into the open position even if the gas container had been completely empty at the time the refilling began.

For a system having two standard liquid containers of twenty or fifty pounds each, the diameter of a cylindrical orifice is preferably about one-thirty-second (0.03125) to one-sixteenth (0.0625) inch. This range of diameters provides a range of cross-sectional areas of about $7.7 \times 10^{-4}$ square inches to $3.1 \times 10^{-3}$ square inches. The cross-sectional area of the orifice is generally about $1 \times 10^{-4}$ to $1 \times 10^{-2}$ square inches. If the cross-sectional area of the orifice is too small, the pressure may not build up to a sufficient level during refilling. If the cross-sectional area of the orifice is too large, excessive amounts of carbon dioxide flow into the gas container during refilling which can reduce the volume of gas available for immediate use in dispensing the carbonated beverages.

Locating a cylindrical orifice in the head of the piston of the valve is the preferred means for allowing a small flow of fluid from the liquid container(s) to the gas container(s) when the valve is in the closed/refilling position. However, other shapes of orifices such as notches, channels, and the like are suitable provided they have the desired cross-sectional area.

The manifold is useful in any system in which a fluid is stored in liquid and gas phases and is dispensed in the gas phase. For example, carbon dioxide in the gas phase is used for a variety of purposes in addition to carbonating beverages. As another example, other elements and compounds, including argon, propane, nitrous oxide, and the like, are dispensed in the gas phase.

I claim:

1. A manifold for a carbon dioxide system comprising a pump supply, a liquid container, a gas container, and a beverage dispenser, the manifold comprising:
   (a) an internal passage providing communication between the pump supply, the liquid container, the gas container, and the beverage dispenser; and
   (b) a valve inside the internal passage having an open/operating position in which communication exists between the liquid container, the gas container, and the beverage dispenser, but not with the pump supply; and having a closed/refilling position in which communication exists between the pump supply and the liquid container, and between the gas container and beverage dispenser, but the only communication between the pump supply/liquid container and the gas container/beverage dispenser is through an orifice that allows a restricted flow of carbon dioxide through the valve.

2. The manifold of claim 1 wherein the valve comprises a sliding spool valve.

3. The manifold of claim 2 wherein the sliding spool valve comprises a piston having an internal chamber with an inlet and an outlet, and a head having an orifice.

4. A manifold for a carbon dioxide system comprising a pump supply, a liquid container, a gas container, and a beverage dispenser, the manifold comprising:
   (a) an internal passage means providing communication between the pump supply, the liquid container, the gas container, and the beverage dispenser; and
   (b) a valve means inside the internal passage means having an open/operating position in which communication exists between the liquid container, the gas container, and the beverage dispenser, but not with the pump supply; and having a closed/refilling position in which communication exists between the pump supply and the liquid container, and between the gas container and beverage dispenser, but the only communication between the pump supply/liquid container and the gas container/beverage dispenser is through an orifice that allows a restricted flow of carbon dioxide through the valve means.

5. The manifold of claim 4 wherein the valve means comprises a sliding spool valve.

6. The manifold of claim 5 wherein the sliding spool valve comprises a piston having an internal chamber with an inlet and an outlet, and a head having an orifice.

7. A dispensing system for a fluid stored in liquid and gas phases, the system comprising a liquid pump supply, a liquid container, a gas container, a gas dispenser, and a manifold comprising:
   (a) an internal passage providing communication between the pump supply, the liquid container, the gas container, and the gas dispenser; and
   (b) a valve inside the internal passage having an open/operating position in which communication exists between the liquid container, the gas container, and the gas dispenser, but not with the pump supply; and having a closed/refilling position in which communication exists between the pump supply and the liquid container, and between the gas container and gas dispenser, but the only communication between the pump supply/liquid container and the gas container/gas dispenser is through an orifice that allows a restricted flow of carbon dioxide through the valve from the pump supply/liquid container to the gas container/gas dispenser.

8. The system of claim 7 wherein the valve comprises a sliding spool valve.

9. The system of claim 8 wherein the sliding spool valve comprises a piston having an internal chamber with an inlet and an outlet, and a head having an orifice.

10. The system of claim 9 wherein the orifice has a cross-sectional area of about $1 \times 10^{-4}$ to $1 \times 10^{-2}$ square inches.

* * * * *